(12) United States Patent
Mitchem et al.

(10) Patent No.: US 11,792,317 B2
(45) Date of Patent: Oct. 17, 2023

(54) CLOUD AUDIO

(71) Applicant: Operata Pty Ltd, Victoria (AU)

(72) Inventors: John Maurice Mitchem, Victoria (AU); Andrew Philip Scott, Victoria (AU); Romilly Blackburn, Victoria (AU)

(73) Assignee: Operata Pty Ltd, Victoria (AU)

( * ) Notice: Subject to any disclaimer, the term of this patent is extended or adjusted under 35 U.S.C. 154(b) by 168 days.

(21) Appl. No.: 17/515,311

(22) Filed: Oct. 29, 2021

(65) Prior Publication Data
US 2022/0141332 A1   May 5, 2022

(30) Foreign Application Priority Data
Oct. 29, 2020   (AU) ................. 2020903933

(51) Int. Cl.
*H04M 3/22*   (2006.01)
(52) U.S. Cl.
CPC ....... *H04M 3/2236* (2013.01); *H04M 3/2218* (2013.01); *H04M 3/2227* (2013.01)
(58) Field of Classification Search
CPC . H04M 3/2236; H04M 3/2218; H04M 3/2227
See application file for complete search history.

(56) References Cited

U.S. PATENT DOCUMENTS

| | | | | |
|---|---|---|---|---|
| 7,203,305 B1* | 4/2007 | Hajj | .................... | H04M 3/5175 379/265.09 |
| 8,396,468 B1* | 3/2013 | Krinsky | ................ | H04W 24/00 455/67.11 |
| 2005/0286686 A1* | 12/2005 | Krstulich | ........... | G06Q 30/0205 379/32.04 |
| 2008/0219243 A1* | 9/2008 | Silverman | ........... | H04M 3/5175 370/352 |
| 2013/0166340 A1* | 6/2013 | Salame | .................. | G06Q 10/06 705/7.14 |

* cited by examiner

*Primary Examiner* — Brenda H Pham
(74) *Attorney, Agent, or Firm* — Davis Wright Tremaine LLP

(57) ABSTRACT

Disclosed is a method of determining call quality for a contact centre. A call is initialised between a customer agent and a contact centre agent, with the customer agent connecting to the call at a point of presence having a selectable geographic location. Monitoring information is received, for the call, measured at the customer agent, the contact centre agent and a contact centre service provider connecting the call between the customer agent and the contact centre agent. Quality of the call is determined from the monitoring information collected from the customer agent, the contact centre agent and the contact centre service provider.

22 Claims, 11 Drawing Sheets

CLOUD AUDIO

TECHNICAL FIELD

The present invention relates to determining call quality, and particularly for a contact centre, such as one provisioned by a contact centre as a service (CCaaS) provider using cloud-based infrastructure. Call quality includes audio quality of call with the contact centre.

BACKGROUND

Contact centres play an important role in allowing communication between customers and an organisation. The customer may contact the organisation using a variety of different communications methods. In addition to traditional voice calls, a contact centre may use instant messaging, e-mail, live support software, social media as well as other telephony-based communication such as interactive voice response using voice or dual-tone multi-frequency (DTMF) tones.

Simple voice contact centres for an organisation have been operated and performed all functions in-house within the organisation. The organisation would operate all the hardware receiving calls from the public switched telephone system and route them inside the contact centre. Any problems in the contact centre would be the responsibility of the organisation who would diagnose and fix problems. Such an operation meant that the organisation controlled the contact centre with the only external part of the operation being the public switched telephone system. Any problems not located within the contact centre could be resolved by dealing with the public switched telephone system provider.

However, contact centres now rely on more complex systems than just the public switched telephone system for telephony-based communications. Instead, a mix of public switched telephone system and network communications may be used. In particular, such a mixture may be used when a contact centre as a service (CCaaS) is in operation. A contact centre as a service allows an organisation to set up a contact centre while using limited resources within the organisation. For example, an organisation may provide operators and configure live support software while the contact centre as a service provider is responsible for other operations of the contact centre.

As a result, finding problems for a contact centre is now much more complicated. Some components of the contact centre operation may be provided by external parties. While it may be cost effective to use an external party to provide a contact centre as a service, such services may also make fault finding more difficult. Degradation of audio call quality may occur in a number of different systems and only some of those systems may be under the control of the contact centre operator. For example, if an operator suffers from poor audio quality and has difficulty understanding a caller, the problem may be caused anywhere between the caller and the operator. Addressing call quality is a significant issue when a CCaaS system is used as there are many and a variety of points of presence as calls are routed across IP nodes. Different networks may be used across different jurisdictions.

Accordingly, it is desired to address this or at least provide a useful alternative.

SUMMARY

According to the present invention, there is provided a method of determining call quality for a contact centre, the method comprising:

initialising a call between a customer agent and a contact centre agent, the customer agent connecting to the call at a point of presence having a selectable geographic location;

receiving monitoring information, for the call, measured at the customer agent, the contact centre agent and a contact centre service provider connecting the call between the customer agent and the contact centre agent; and determining quality of the call from the monitoring information collected from the customer agent, the contact centre agent and the contact centre service provider.

The present invention also provides a system for determining call quality of a contact centre, the system comprising:

a contact centre monitor comprising:
a caller to initialise a call between a customer agent and a contact centre agent, the customer agent connecting to the call at a point of presence having a selectable geographic location;
a service monitor to receive monitoring information, for the call, measured at the customer agent, the contact centre agent and a contact centre service provider connecting the call between the customer agent and the contact centre agent; and
a quality analyser to determine quality of the call from the monitoring information collected from the customer agent, the contact centre agent and the contact centre service provider.

BRIEF DESCRIPTION OF DRAWINGS

At least one embodiment of the present invention is described, by way of example only, with reference to the accompanying figures.

DETAILED DESCRIPTION

A contact centre service monitoring system 500 is described herein and provides a global service monitor 501 that can determine call quality, particularly audio quality, for a contact centre. A call is initialised between a customer agent and an agent of the contact centre. The customer agent connects to a public switched telephone network (PSTN) at a point of presence to connect to the agent of the contact centre. The point of presence has a selectable geographic location. During the call, monitoring information is collected and received by the global service monitor. The monitoring information is collected at the customer agent, the contact centre agent and a contact centre service provider connecting the call between the point of present and the agent. The monitoring information is then used to determine call quality.

The contact centre service monitoring system 500 may observe, measure and report on call quality metrics. The call quality may include audio quality of the contact centre as a service provider, telecommunications provider and/or end-user private network.

The global service monitor uses a customer agent and a contact centre agent. The agents may be software operating on a server with operation controlled by the global service monitor. Alternatively, the contact centre agent may be a human operator. The agents can play and receive audio on a telephone call. The audio may also be recorded and sent to the global service monitor for analysis. Some aspects of the operation of the agents may be performed by the global service monitor or may be distributed to other systems.

Figure 1:
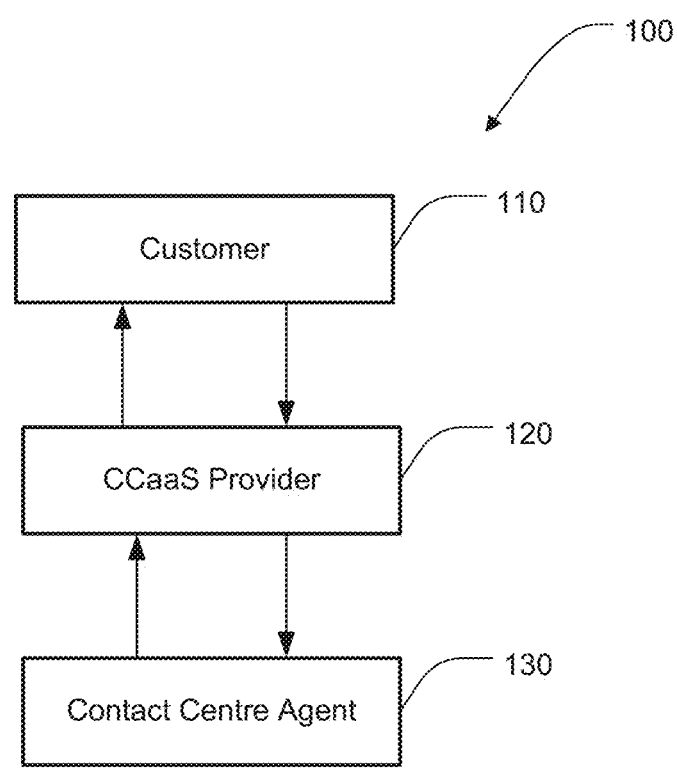
FIG. 1 illustrates communications flow for a contact centre using a contact centre as a service provider according to one embodiment.

FIG. 1 shows a communications network 100 including the PSTN and how a contact centre call may be connected when using a contact centre as a service (CCaaS) provider 120. The call may start when a customer 110 places a call to a contact centre using a client device 110, such as a phone. The call may be placed with the intention to talk to a contact centre agent or to interact with an interactive voice response system. The call is received by a contact centre as a service provider 120, sometimes referred to as a contact centre service provider. The contact centre as a service provider 120 provides contact centre services software to a contact centre operator. When the contact centre operator uses a contact centre service provider, the equipment used to operate many functions of the contact centre may be located at premises owned by the contact centre service provider, remote to the contact centre operator. An advantage of such an arrangement is that the contact centre operator is no longer burdened by the requirements of running and maintaining equipment for all of the contact centre. Further, the contact centre service provider can leverage economies of scale to provide the service to the contact centre operator for a lower price than the contact centre operator may be able to achieve. The contact centre as a service provider 120 connects the call to a contact centre agent. For a voice call the contact centre agent may be a human operator, using an agent device 130 such as a telephone, which can take the call and handle the customer interaction. However, software agents may also be used. For example, a software agent may be used for an interactive voice response system, however systems such as an interactive voice response may be operated by the contact centre as a service provider 120. The communication over the call is typically bidirectional. As shown in FIG. 1, the call is made over two links, a first link between the customer 110 and the contact centre as a service provider 120 and a second link is between the contact centre as a service provider 120 and the contact centre agent 130.

Figure 2:
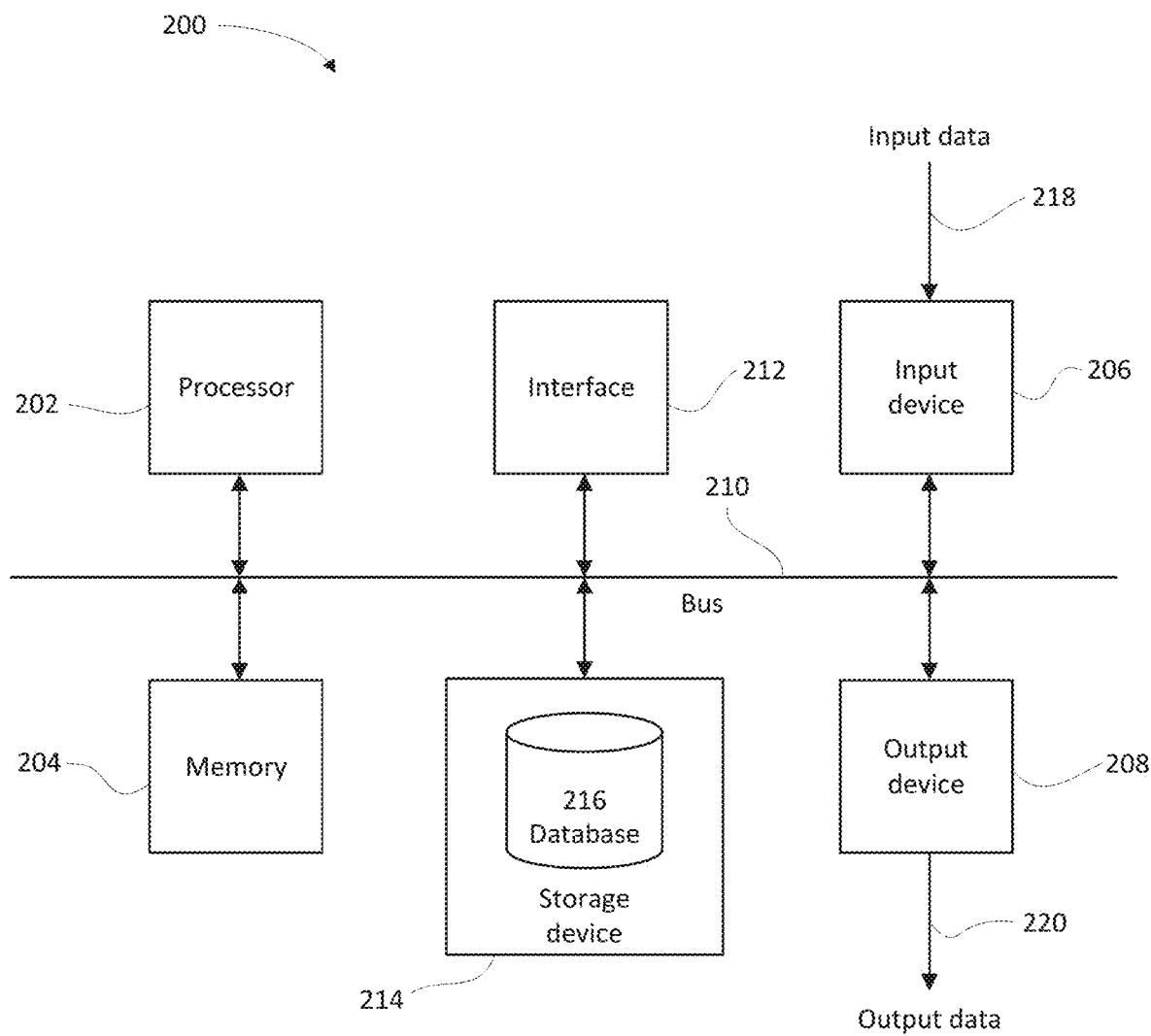
FIG. 2 illustrates a functional block diagram of an example processing system that can be utilised to embody or give effect to a particular embodiment.

Client and agent devices and servers of the contact centre service monitoring system are implemented using a processing system, as shown in FIG. 2. In particular, the processing system 200 generally includes at least one processor 202, or processing unit or plurality of processors, memory 204, at least one input device 206 and at least one output device 208, coupled together via a bus or group of buses 210. In certain embodiments, input device 206 and output device 208 could be the same device. An interface 212 can also be provided for coupling the processing system 200 to one or more peripheral devices, for example interface 212 could be a PCI card or PC card. At least one storage device 214 which houses at least one database 216 can also be provided. The memory 204 can be any form of memory device, for example, volatile or non-volatile memory, solid state storage devices, magnetic devices, etc. The processor 202 could include more than one distinct processing device, for example to handle different functions within the processing system 200.

Input device 206 receives input data 218 and can include, for example, a keyboard, a pointer device such as a pen-like device or a mouse, audio receiving device for voice-controlled activation such as a microphone, data receiver or antenna such as a modem or wireless data adaptor, data acquisition card, etc. Input data 218 could come from different sources, for example keyboard instructions in conjunction with data received via a network. Output device 208 produces or generates output data 220 and can include, for example, a display device or monitor in which case output data 220 is visual, a printer in which case output data 220 is printed, a port for example a USB port, a peripheral component adaptor, a data transmitter or antenna such as a modem or wireless network adaptor, etc. Output data 220 could be distinct and derived from different output devices, for example a visual display on a monitor in conjunction with data transmitted to a network. A user could view data output, or an interpretation of the data output, on, for example, a monitor or using a printer. The storage device 214 can be any form of data or information storage means, for example, volatile or non-volatile memory, solid state storage devices, magnetic devices, etc.

In use, the processing system 200 is adapted to allow data or information to be stored in and/or retrieved from, via wired or wireless communication means, the at least one database 216. The interface 212 may allow wired and/or wireless communication between the processing unit 202 and peripheral components that may serve a specialised purpose. The processor 202 receives instructions as input data 218 via input device 206 and can display processed results or other output to a user by utilising output device 208. More than one input device 206 and/or output device 208 can be provided. It should be appreciated that the processing system 200 may be any form of terminal, server, specialised hardware, or the like.

Figure 3:
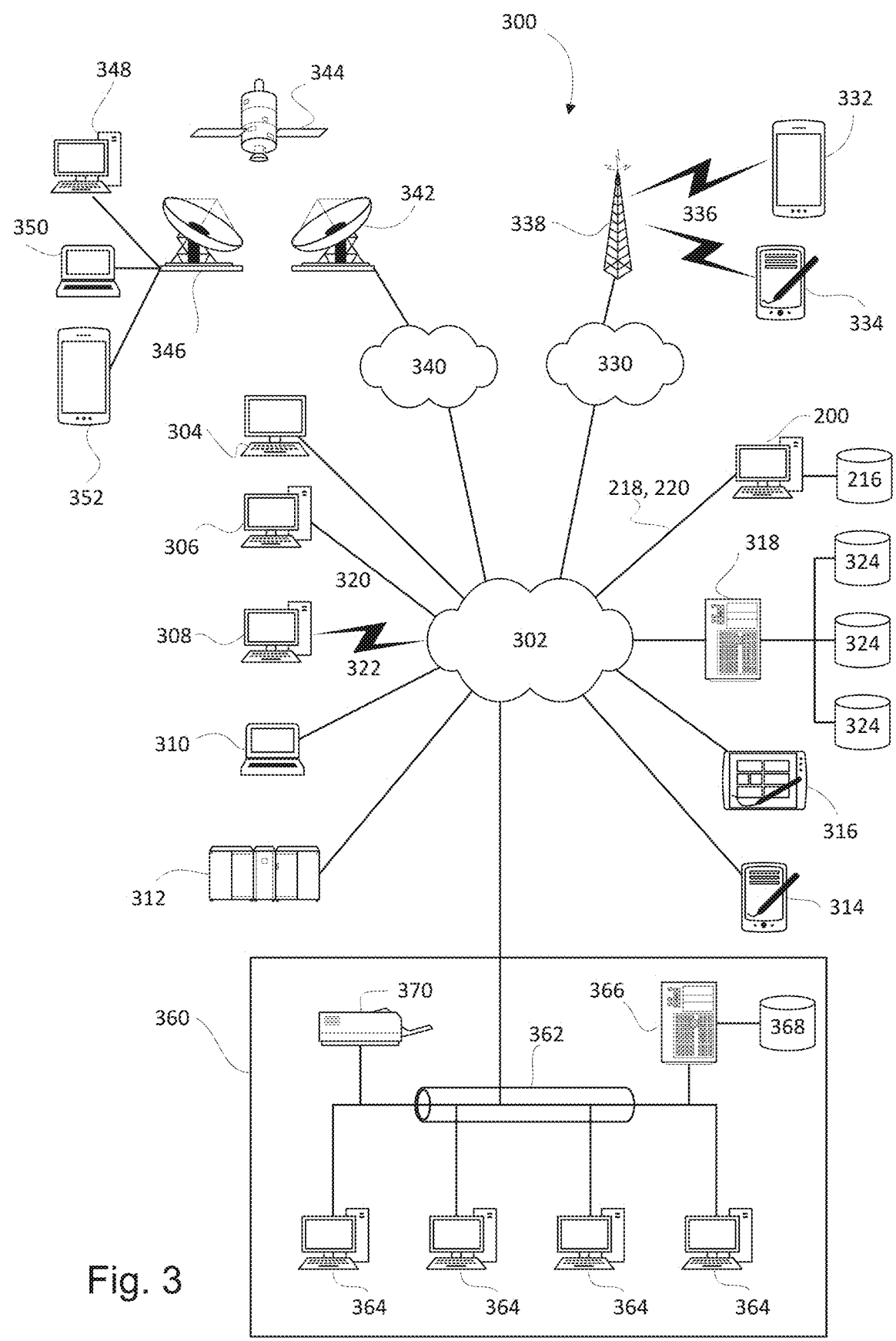
FIG. 3 illustrates an example network infrastructure that can be utilised to embody or give effect to a particular embodiment.

The processing system 200 is part of a networked communications system 300, as shown in FIG. 3. The processing system 200 connects to the communications network 302, for example the Internet or a WAN. Input data 218 and output data 220 could be communicated to other devices via network 302. Other terminals, for example, thin client 304, further processing systems 306 and 308, notebook computer 310, mainframe computer 312, PDA 314, pen-based computer or tablet 316, server 318, etc., can be connected to network 302. A large variety of other types of terminals or configurations could be utilised. The transfer of information and/or data over network 302 can be achieved using wired communications means 320 or wireless communications means 322. Server 318 can facilitate the transfer of data between network 302 and one or more databases 324. Server 318 and one or more databases 324 provide an example of an information source.

Other networks may communicate with network 302. For example, telecommunications network 330 could facilitate the transfer of data between network 302 and mobile, cellular telephone or smartphone 332 or a PDA-type device 334, by utilising wireless communication means 336 and receiving/transmitting station 338. Satellite communications network 340 could communicate with satellite signal receiver 342 which receives data signals from satellite 344 which in turn is in remote communication with satellite signal transmitter 346. Terminals, for example further processing system 348, notebook computer 350 or satellite telephone 352, can thereby communicate with network 302. A local network 360, which for example may be a private network, LAN, etc., may also be connected to network 302. For example, network 302 could be connected with ethernet 362 which connects terminals 364, server 366 which controls the transfer of data to and/or from database 368, and printer 370. Various other types of networks could be utilised.

The processing system 200 is adapted to communicate with other terminals, for example further processing systems 306, 308, by sending and receiving data, 218, 220, to and from the network 302, thereby facilitating possible communication with other components of the networked communications system 300.

Thus, for example, the networks 302, 330, 340 may form part of, or be connected to, the Internet, in which case, the terminals 306, 312, 318, for example, may be web servers, Internet terminals or the like. The networks 302, 330, 340, 360 may be or form part of other communication networks, such as LAN, WAN, ethernet, token ring, FDDI ring, star, etc., networks, or mobile telephone networks, such as GSM, CDMA, 4G, 5G etc., networks, and may be wholly or partially wired, including for example optical fibre, or wireless networks, depending on a particular implementation.

Figure 4:
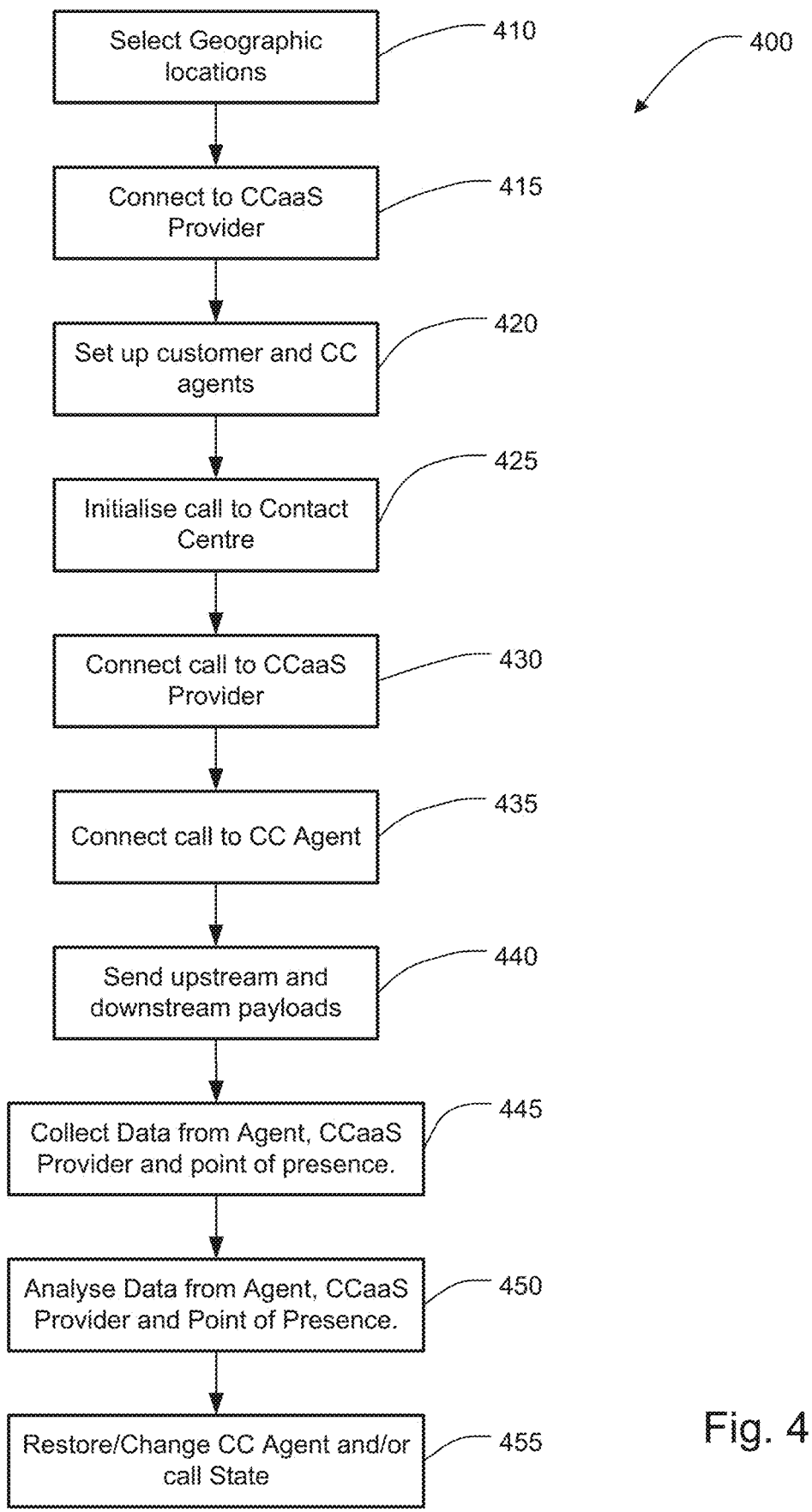
FIG. 4 is flowchart for a method of contact centre service monitoring according to one embodiment.

A method of contact centre service monitoring 400, as shown in FIG. 4, is executed on two or more computers, such as the processing system 200, communicating over a network such as the network 302. The computers may be end points, such as client terminal devices, or support points of presence, in a call. The method of contact centre service monitoring 400 involves a simulated customer, a customer agent, calling a contact centre. The call is connected to a contact centre agent via a contact centre service provider. A test of the connections between the customer agent, the contact centre service provider and the contact centre agent is performed and the result are collected by the global service monitor, also referred to as a service monitor, and stored for future reference.

The method of contact centre service monitoring 400 starts with a selection step 410 where a geographic location may be selected for a point of presence, where the customer agent connects to the public switched telephone network. The point of presence geographic location may be selected as a location, such as a city, or a network location combined with a geographic location, such as a specific telephone exchange. In some embodiments, the geographic location of the point of presence may also detail a network provider for the public switched telephone network connection. The purpose of selecting a point of presence is to simulate a location of the customer. For example, to test an Australian contact centre the point of presence may be configured as Melbourne as an Australian city is a likely origin for a call from a customer. Another example may be to select Dallas for an American contact centre. Selecting an unlikely geographic location, such as Dallas for an Australian contact centre may introduce problems in the connection that are unlikely to occur for an actual customer. A geographic location may also be selected for the contact centre service provider. The possible locations will depend on where the contact centre service provider operates. For a large contact centre service provider there may be many possible locations, while a smaller contact centre service provider may have a more limited list of possible locations. Alternatively, the location of the contact centre service provider may be determined by the contact centre service provider when the call arrives.

Next, at a connect to contact centre service provider step 415, the global service monitor connects to a contact centre service provider that operates the contact centre as a service. The connection to the contact centre service provider is generally performed over the internet, such as the network 302, using an application program interface (API) from the contact centre service provider. The connection to the contact centre service provider allows the global service monitor to collect data and statistics for the call. In the method of contact centre service monitoring 400 the connect to contact centre service provider step 415 is shown before the call is made. The connection may be made later in the process. The connection to the contact centre service provider may require information to identify the call once the call reaches the contact centre service provider.

At set up agents step 420 software agents are set up to act as a customer and a contact centre agent. The customer agent may be operated as part of the global system monitor or may be executed on a computer remote to the global system monitor located closer to the geographic location of the point of presence. The customer agent and contact centre agent may be executed on a remote server, such as a cloud instance offering from Amazon, Microsoft or Google. Such arrangements may be referred to as a customer agent server or a contact centre agent server. Both the customer agent and the contact centre agent may be started for execution of a test and stopped at the end of a test. The customer agent and the contact centre agent may operate softphones, such as WebRTC by webrtc.org, that allow the agents to play and record audio over the phone call. Both the customer agent and the contact centre agent may be required to play and record audio as part of the simulation of the customer calling the contact centre. The customer agent and the contact centre agent may also have an echo mode where any audio received is played back. Such a configuration is used when an audio test file is played by the customer agent and echoed back by the contact centre agent.

When the call is connected between the customer agent and the contact centre agent, one agent plays audio to the other agent while recording received audio. As the contact centre may be in operation, that is receiving calls from customers while the test is executed, the contact centre agent may need to be configured to collect the call from the customer agent. This can be achieved by using caller ID, received by the contact centre service provider to identify the call. Alternatively, the contact centre service provider may provide an identifier, such as a job ID from the customer agent, allowing the contact centre service provider to identify the test call from the customer agent. The job ID is sent from the customer agent to the contact centre service provider over the telephone call using dual tone multi-frequency signalling or some other form of signalling. Alternatively, dual tone multi-frequency signalling may be used by the customer agent to send a testing signal to the contact centre service provider.

At a call contact centre step 425 a call is placed from the customer agent, using the point of presence at the selected geographic location, to the contact centre. The call is placed over the public switched telephone network from the point of presence using the phone number of the contact centre. At connect call step 430 the call from the customer agent is received by the contact centre service provider. The contact centre service provider processes the call through the contact centre systems. As discussed above, the customer agent may identify the call to the contact centre service provider so that the call can be detected and monitored by the global service monitor. At a connect call step 435 the call is routed from the contact centre service provider to the contact centre agent configured earlier at the set up agents step 420.

The call is now connected from the customer agent to the contact centre agent. Testing of the contact centre operation may begin. At a transmit test data step 440, data, in the form of an audio test signal, is played by the customer agent and transmitted over the telephone line to the contact centre agent. For a telephone phone call there is both an upstream and downstream communication path to test. A predetermined audio signal may be played by the customer agent for transmission to the contact centre agent. Similarly, a predetermined audio signal may be played by the contact centre agent to the customer agent.

At a data collection step 445 data is collected from one or more of the customer agent, the contact centre service provider and the contact centre agent. The data is collected over computer network connections to the customer agent, the contact centre service provider and the customer agent. The data collected may include audio recordings, timing information for the audio recordings and log information. Other information may be collected such as metadata for the recordings including date of recording, time of recording, server information and application information like application version.

The data collected at the data collection step 445 is then analysed at an analyse data step 450. Since information is collected at three locations, the customer agent, the contact centre service provider and the contact centre agent, the data may be analysed at each location. To determine audio quality between the customer agent and the contact centre service provider may involve analysing audio received by the customer agent from the contact centre service provider and audio received by the contact centre service provider from the customer agent. To determine audio quality between the contact centre agent and the contact centre service provider may involve analysing audio received by the contact centre agent from the contact centre service provider and audio received by the contact centre service provider from the contact centre agent.

Analysing data at each location allows for comparisons to be made between the locations and may allow the global service monitor to determine where a problem occurs. For example, an analysis of the audio test data from the contact centre agent to the customer agent may involve analysis of audio recordings made at the three locations mentioned above. The analysis may find that audio sent from the contact centre agent degraded significantly by the time that the audio signal reached the contact centre provider. The loss of audio quality may have occurred due to a lack of bandwidth between the contact centre agent and the contact centre service provider. Alternatively, the contact centre service provider may be a source of the audio degradation. Comparison of the audio recordings at the contact centre service provider and the customer agent may show that no further audio quality loss occurred.

The analyse data step 450 may analyse latency, by looking at timing information for the audio recordings at the customer agent, the contact centre service provider and the contact centre agent. For the audio sent from the customer agent to the contact centre agent a start time of the audio test signal is known. The start time may be compared to timestamps for when the audio test signal is received by the contact centre service provider and the contact agent. Latency of the signal may be determined by comparing the time information and latency bottlenecks identified. An alternative approach to determine latency is to send a message from the customer agent to the contact centre agent and have the contact centre agent echo and audio received. This allows the customer agent and the contact centre service provider to determine latency from the time between sending and receiving the audio. Such an approach does not require any form of time synchronisation between the customer agent, contact centre service provider or the contact centre agent. Isolating the source of latency to a link between the customer agent and the contact centre service provider or the contact centre service provider and the contact centre agent allows for more accurate problem diagnosis. Typically, a round trip latency of less than 320 milliseconds is considered acceptable. If one of the links, such as between the contact centre service provider and the contact centre agent, is identified as using too much of the allowed time then a fix may be employed between the contact centre service provider and the contact centre operator. For example, bandwidth may be increased between the contact centre service provider and the contact centre operator to ameliorate latency issues.

At a restore state step 455 changes made by the method of contact centre service monitoring 400 may be reversed. For example, the contact centre agent and/or the customer agent may be deactivated to reverse the set up agents step 420. The call connected between the customer agent and the contact centre agent may also be disconnected.

Figure 5:
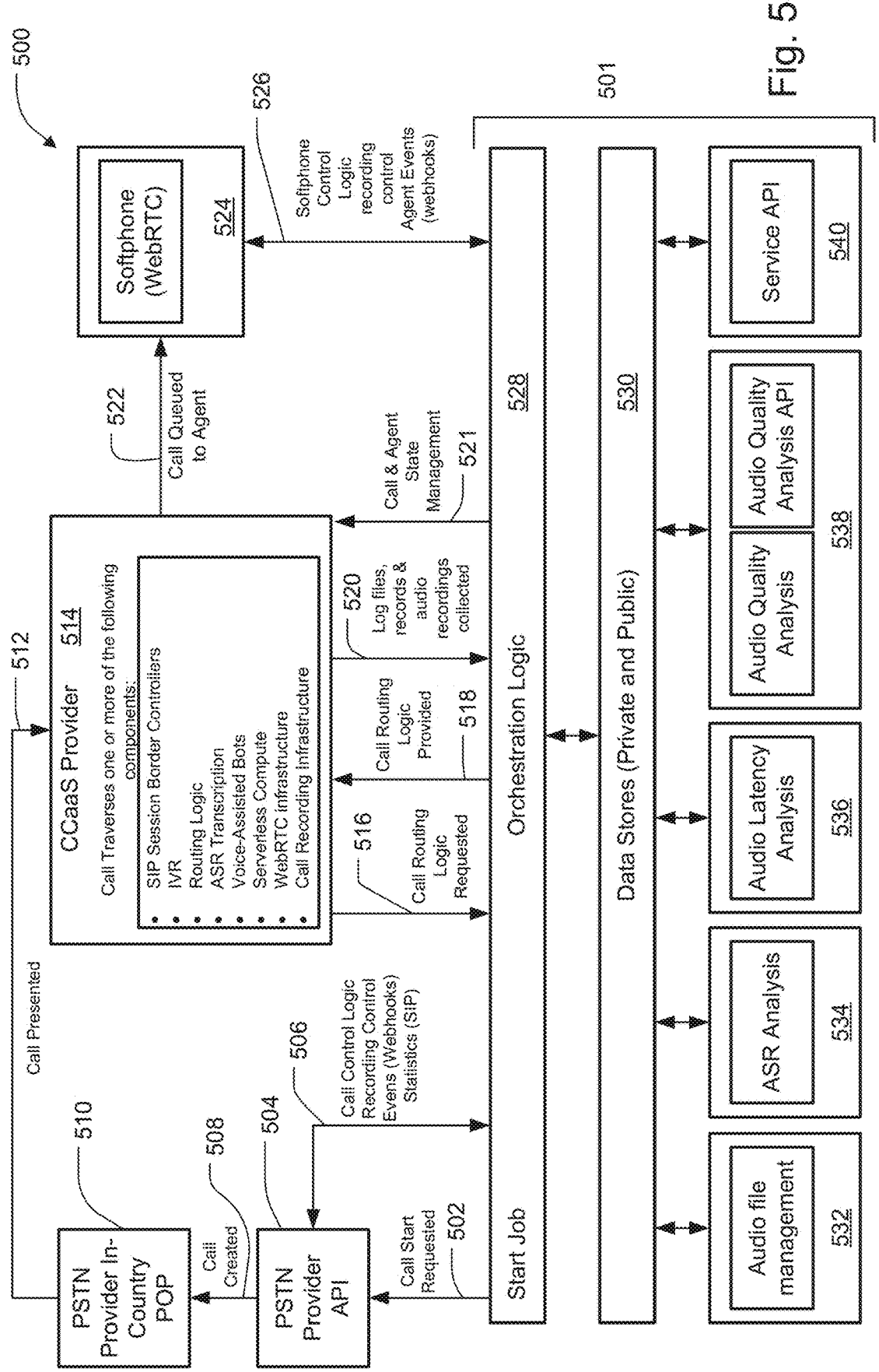
FIG. 5 illustrates a data flow for a contact centre service monitoring system according to one embodiment.

The contact centre service monitoring system 500, as shown in FIG. 5, includes the global service monitor 501 which has a number of components including an orchestration layer 528, data stores 530, audio file management 532, answer seizure ratio analyser 534, latency analyser 536, quality analyser 538 and API interface 540. The system 500 performs the method of contact centre service monitoring 400 described above and uses computers, such as the processing system 200 and networks such as the network 302. The service monitoring system 500 can be executed with different components of the global service monitor 501 operating as cloud instances and each of the instances connected via a network connection. For example, each of the audio file manager 532, answer seizure ratio analyser 534, latency analyser 536, quality analyser 538 and the API interface 540 can run on separate cloud instances and communicate over network connections.

The service monitor 501 starts by sending a call start request 502 to a customer agent 504. The call start request 502 is sent from the orchestration layer 528. The orchestration layer 528 is responsible for coordinating various elements of the global service monitor and ensuring that the customer agent 504, a CCaaS provider 514 and a contact centre agent 524 operate together for the testing and, on completion of the testing, restoring the customer agent 504, the CCaaS provider 514 and the contact centre agent 524 to a pre-test state as described for the restore state step 455 of the method of contact centre service monitoring 400 above. The customer agent 504, CCaaS provider 514 and the contact centre agent 524 may be remotely located from each other. That is, the customer agent 504, CCaaS provider 514 and the contact centre agent 524 may be executed at different locations. The nature of the orchestration is described in further detail below.

Once the call start request 502 has started the call, the orchestration layer 528 connects to the customer agent 504 via a service monitor to customer agent interface 506. While the call start request 502 is a direction to the customer agent 504, the service monitor to customer agent interface 506 allows the orchestration layer 528 to collect information from the customer agent 504 as well as trigger further actions. The orchestration layer 528 may control actions of the customer agent 504 using the service monitor to customer agent interface 506, such as starting audio tests as well as starting and stopping audio recordings at the customer agent 504. The service monitor to customer agent 506 provides call control logic, recording control event using a webhook and gathers call statistics using session-initiated protocol (SIP).

The customer agent 504 connects, via create call 508, to a point of presence 510. The point of presence 510 is a connection into the public switched telephone network at a selected geographic location. The geographic location is selected by the orchestration layer 528 and communicated to the customer agent 504 via the service monitor to customer agent interface 506. The geographic location of the customer agent 504 may also be selected based on the geographic location of the point of presence 510. Generally, the customer agent 504 will be located close to the point of presence 510 to limit any latency issues. The point of presence 510 dials, i.e., presents a call to, the CCaaS provider 514 and a connection to contact centre as a service (CCaaS) provider 512 is established. The connection to the CCaaS provider 512 may be done using the public switched telephone network and is typically a bidirectional communication link. The call from the point of presence 510 is now connected to the CCaaS provider 514.

The CCaaS provider 514 has a number of different components that the call may traverse. For example, the call may pass through a system such as session-initiated protocol (SIP) session border controllers, an interactive voice response system, routing logic, an answer seizure ratio system/transcription, a voice-assisted bot, serverless compute, webRTC infrastructure, or a call recording system/ infrastructure. The customer agent 504 may send commands to the CCaaS provider 514 to identify the call or to select routing for the call. For example, dual tone multi-frequency (DTMF) signalling may be sent to interact with a service menu presented by the CCaaS provider 514 or to select a testing mode. Dual tone multi-frequency signalling may also be used to send a call ID to the CCaaS provider 514 so that the test call can be identified. The call may then trigger a connection to contact centre agent 522, with a call queued to the agent, to link the CCaaS provider 514 to the CC agent 524.

The orchestration layer 528 may have one or more connections to the CCaaS provider 514 over network connections, such as an internet connection. Examples of the connections may include a call routing request 516, call routing information 518, a data collection connection 520 and call and agent state management 521. The call routing request 516 may be sent from the CCaaS provider 514 to the orchestration layer 528 asking for call routing logic information on how the call from the customer agent 504 is to be routed. The call routing information 518 provides the call routing logic to the CCaaS provider 514 and allows the call to be routed according to the response from the orchestration layer 528. The call routing information 518 may avoid navigating interactive menus using DTMF signals, as described above. The data collection connection 520 is used to collect monitoring information from the CCaaS provider 514. Such information may include log files, records and audio recording that are made at the CCaaS provider 514. The call and agent state management 521 allows the orchestration layer 528 to manage the call as well as manage the contact centre agent 524. The call routing request 516, call routing information 518, data collection connection 520 and call and agent state management 521 may communicate to the CCaaS provider 514 through an intermediate agent, referred to as event driven logic that will be described in more detail below.

The call and agent state management 521, between the orchestration layer 528 and the CCaaS provider 514, provides a number of management operations through the CCaaS provider 514. While commands are sent from the orchestration layer 528 to the CCaaS provider 514, data may also pass in the other direction. Using the call and agent state management 521, the orchestration layer 528 may fetch a current state of the contact centre agent 524, such as on-call, available, offline or on-break. The current state information may be used when the contact centre agent 524 used for testing is an operational part of the CCaaS provider 514. For example, when using the equipment of a human operator as the contact centre agent 524 to test an operational contact centre agent instead of using a special test contact centre agent for the contact centre agent 524. The call and agent state management 521 may also fetch queue, group and routing information such as queues, groups and/or routing profiles for the contact centre agent 524, i.e., groups for which the contact centre agent 524 is a member. As with the current state information, the queue, group and routing information is useful when the contact centre agent 524 is selected to test equipment of a human operator. The orchestration layer 528 may update the queue, group and routing information so the contact centre agent 524 can have a call routed and accepted from the customer agent 504 as well as prevent a non-test call being routed to the contact centre agent 524 from a standard queue.

The call and agent state management 521 may also update the state of the contact centre agent 524 to a different state, depending on the capability of the CCaaS provider 514. For example, the CCaaS provider 514 may be instructed by the orchestration layer 528, via the call and agent state management 521, to change the contact centre agent 524 from "offline" to "available". Such a state change may be performed at the start and/or the end of a test. At the start of a test the state of the contact centre agent 524 may be changed to "offline" so that no customer calls are transferred to the contact centre agent 524. At the end of the test, the state of the contact centre agent 524 may be changed to "available" or "on-break" to allow the contact centre agent 524 to have calls connected from the CCaaS provider 514. Further, at the end of a job, the orchestration layer 528 may send commands to the CCaaS provider 514 to revert the contact centre agent 524 to the original fetch queue, group and routing information for the contact centre agent 524.

The contact centre agent 524 may operate as a softphone on a server located at a contact centre operator location. Alternatively, the contact centre agent 524 may operate on a computer as a representative example of how the CCaaS provider 514 would interact with a contact centre agent 524. In another alternative, the contact centre agent 524 maybe a human operator providing the operation of the contact centre agent 524 with information collected from the softphone used by the human operator. In such an example, the location of the contact centre agent 524 computer may be selected to have a geographic location that approximates the contact centre operator location. However, use of a human operator may allow testing of connections used by the contact centre. An example of a softphone for the contact centre agent 524 is webRTC, an open-source project from webrtc.org. The use of a softphone allows the orchestration layer 528 to control operation of the contact centre agent 524 through a service monitor to contact centre (CC) agent connection 526, where information such as softphone control, logic recording control and agent events (webhooks) may be sent. The contact centre agent 524 may record audio from the call as well as transmit audio to the customer agent 504 via the CCaaS provider 514.

The service monitor to CC agent connection 526 provides softphone control logic of the contact centre agent 524 from the orchestration layer 528. In one example, the service monitor to CC agent connection 526 may be facilitated via JavaScript, or similar, injected into a WebRTC softphone of the contact centre agent 524 using a browser extension for a web browser such as Google Chrome or Mozilla Firefox. The browser operates on a computer that may be located at the contact centre agent 524. The service monitor to CC agent connection 526 controls the softphone of the contact centre agent 524 and allows the orchestration layer 528 to execute commands, via the service monitor to CC agent connection 526, to answer a call, mute, unmute, hold, dial-out, etc. The commands are instructed by the orchestration layer 528 using a web socket (WSS) mechanism or similar.

The service monitor to CC agent connection 526 can send softphone debug logs and events from the contact centre agent 524 to the data stores 530, under control of the orchestration layer 528. The service monitor to CC agent connection 526 can also send softphone information such as WebRTC session metrics and events, which may be sent to the data stores 530. Operating the service monitor to CC agent connection 526 as a browser extension allows logic to operate at the contact centre agent 524. In one example, the browser extension can monitor communications with the orchestration layer 528. If a communication error is detected by the browser extension, the browser extension may revert the contact centre agent 524 back to an original state, i.e., a state before the start of the test, to allow the contact centre agent 524 to resume operation as part of the CCaaS provider 514. In one example, the browser extension may revert the contact centre agent 524 to an original state after no communication with the orchestration layer 528 for a predetermined time period The orchestration layer 528 controls some or all operation of the customer agent 504, CCaaS provider 514 and contact centre agent 524. Typically, the orchestration layer 528 may collect audio recordings from the customer agent 504, CCaaS provider 514 and the contact centre agent 524. The recording may be incoming or outgoing for the customer agent 504 and the contact centre agent 524, incoming and outgoing for the CCaaS provider 514 to the customer agent 504 or incoming and outgoing for the CCaaS provider 514 to the contact centre agent 524 and used by the quality analyser 538 to determine a quality measure. The orchestration layer 528 also selects audio files to be played by the customer agent 504 or the contact centre agent 524.

The orchestration layer 528 connects to data stores 530. The data stores 530 manages and provides access to information collected by the orchestration layer 528. For example, audio recording, log files and metadata may all be stored by the data stores 530. The data stored by the data stores 530 may be used by an audio file manager 532, an answer seizure ratio analyser 534, latency analyser 536, quality analyser 538 and an API interface 540. The data stores 530 may be a single database to store data or two or more databases on one or more servers.

The audio file manager 532 may conduct pre-processing operations on audio files in the data stores 530. The audio file manager 532 may also delete audio files that are no longer in use. Audio pre-processing will be described in more detail below.

The answer seizure ratio analyser 534 determines a percentage of calls answered by the contact centre. The answer seizure ratio may be used as a measure of network quality and may be determined using log information from the CCaaS provider 514 provided via the data collection connection 520. The answer seizure ratio analyser 534 does not use the audio recordings.

The latency analyser 536 determines latency for different part of the call between the customer agent 504 and the contact centre agent 524. The latency may be determined, in each direction, between the customer agent 504 and the CCaaS provider 514 and/or between the CCaaS provider 514 and the contact centre agent 524. By combining the latency measure it is possible to determine latency between the customer agent 504 and the contact centre agent 524. One technique to determine latency is to play a message from the customer agent 504 and have the contact centre agent 524 echo any incoming message. An alternative is to have a message played by the customer agent 504 or the contact centre agent 524 at a predetermined time and measure arrival time of the message. However, such an approach requires that the clocks of the point of presence 510, CCaaS provider 514 and the contact centre agent 524 are synchronised or have a known relationship.

The quality analyser 538 determines a quality value, or quality measure, for the audio recording made during the test call. The quality analyser 538 has an audio quality analysis module and may have an audio quality analysis API. The call quality, or audio quality analysis, may be determined using an algorithm such as Perceptual Objective Listening Quality Analysis (POLQA), also known as ITU-T Rec. P.863, or Perceptual Evaluation of Speech Quality, also known as ITU-T P.862. The purpose of the quality testing is to determine speech quality by analysing the recordings of the audio test signals. In addition to executing quality tests to determine a quality measure, the quality analyser 538 may store the results to the data stores 530 where the results may be accessed by the API interface 540.

The API interface 540 allows other applications to interact with the global service monitor 501. The API interface 540 may be used to retrieve quality results, or quality measures, for a selected contact centre, trigger a test of a contact centre, determine if any tests have failed for one or more contact centres, upload new audio files for testing, change point of presence locations for a contact centre or to add/delete/modify a point of presence, contact centre service provider, or contact centre. One use of the API interface 540 may be for a contact centre operator to get any results related to their operation and set up a schedule of when any testing is to occur. The API interface 540 may also be used to retrieve information for a user interface.

Selected interactions between components of the service monitoring system 500 will now be described in more detail in relation to FIGS. 6A and B, FIGS. 7A and B, as well as FIGS. 8A and B. Each of the figures shows a subset of interactions that occur during operation of the global service monitor 501.

Figure 6A:
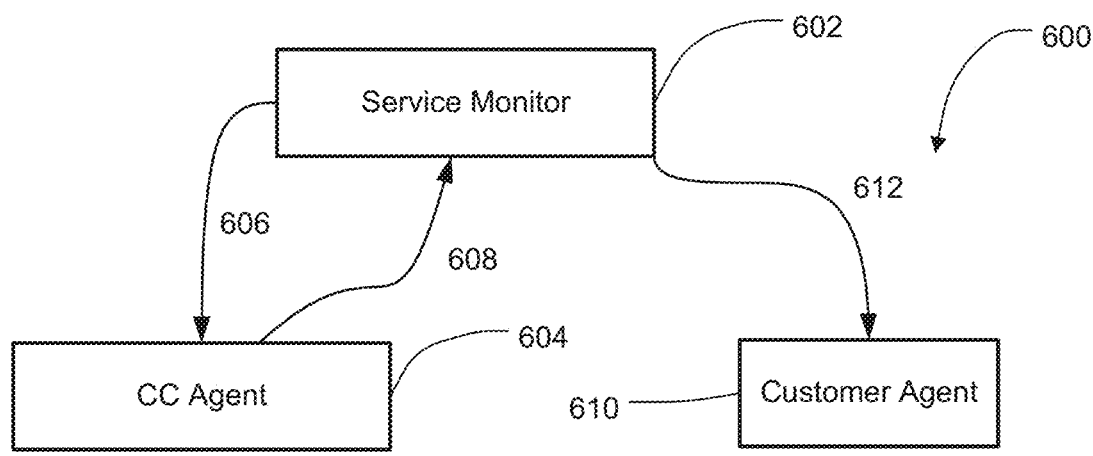
FIGS. 6A and 6B illustrate interactions of the contact centre service monitoring system of FIG. 5 in more detail.

FIG. 6A shows contact centre agent setup 600. A service monitor 602 sends a wake signal 606 to a contact centre agent 604. The contact centre agent 604 is typically sleeping or inactive when no testing is being conducted. This is particularly advantageous when the contact centre agent 604 is executing as a cloud computer instance where a charge is incurred for any time that the contact centre agent 604 is operating. Once the contact centre agent 604 is initialised then an agent available signal 608 is sent from the contact centre agent 604 to the service monitor 602. As the contact centre agent 604 is now available to receive a call, the service monitor 602 may send an initiate call signal 612 to a customer agent 610.

Figure 6B:
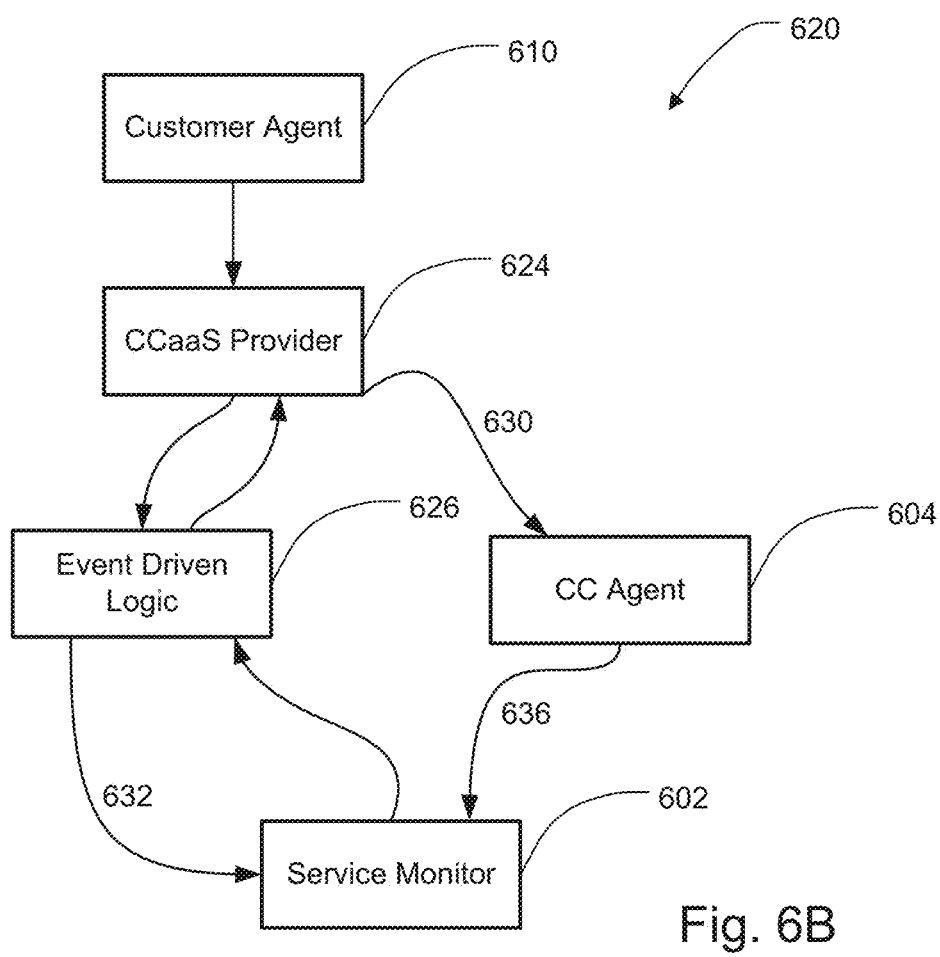

FIG. 6B shows a connected call 620 between the customer agent 610 and the contact centre agent 604. As discussed above, the customer agent 610 connects to a global service monitor and connects to the public switched telephone network at a point of presence. The customer agent 610 may initiate a call to the contact centre agent 604 of a contact centre, with the call initially connecting to a contact centre as a service provider 624. The contact centre as a service provider 624 can provide and receive data via event driven logic 626 to the service monitor 602. The event driven logic 626 may request and receive job information 632 from the service monitor 602 and pass the information on to the contact centre as a service provider 624. The contact centre as a service provider 624 also connects to the contact centre agent 604 and provides a transfer to agent 630 where the call is connected from the contact centre as a service provider 624 to the contact centre agent 604. A call accepted indication 632 may be sent from the contact centre agent 604 to the service monitor 602 to inform the service monitor 602 that the call has been connected.

While the event driven logic 626 is shown as a separate entity to the contact centre as a service provider 624, the two may be provided by the contact centre service provider. An example of such a situation is where the contact centre as a service provider 624 is Amazon Connect, provided by Amazon.com Inc., while the event driven logic 626 is Amazon Web Service's Lambda. While the service monitor 602 communicates to the contact centre as a service provider 624, via the event driven logic 626, alternative arrangements may have the service monitor 602 communicate directly to the contact centre as a service provider 624 without the event driven logic 626.

Figure 7A:
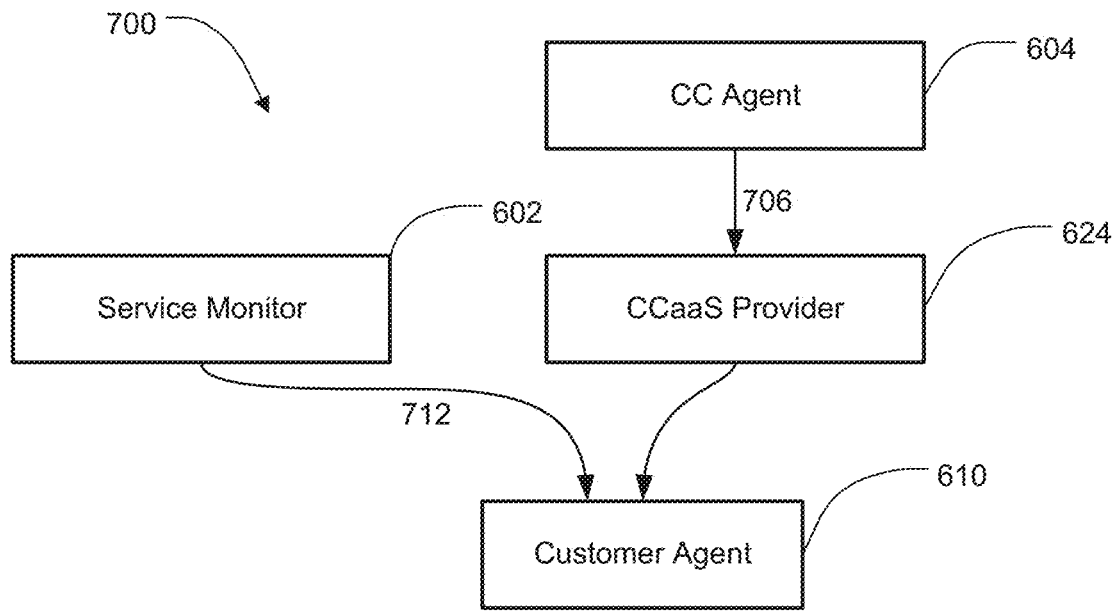
FIGS. 7A and 7B illustrate interactions of the contact centre service monitoring system of FIG. 5 in more detail.

FIG. 7A shows a first link test 700 which shows some of the actions taken as part of an audio test to test call quality. The first link test 700 shows the contact centre agent 604 playing a reference, or test, audio file over a call, as indicated by a play reference file 706 to the contact centre as a service provider 624. The reference audio file is received by the contact centre as a service provider 624 and sent to a point of presence and received by the customer agent 610. The customer agent 610 is connected to the service monitor 602, acting as the global service monitor, which sends a start recording command 712 to the customer agent 610 to start recording the reference audio file played from the contact centre agent 604.

Figure 7B:
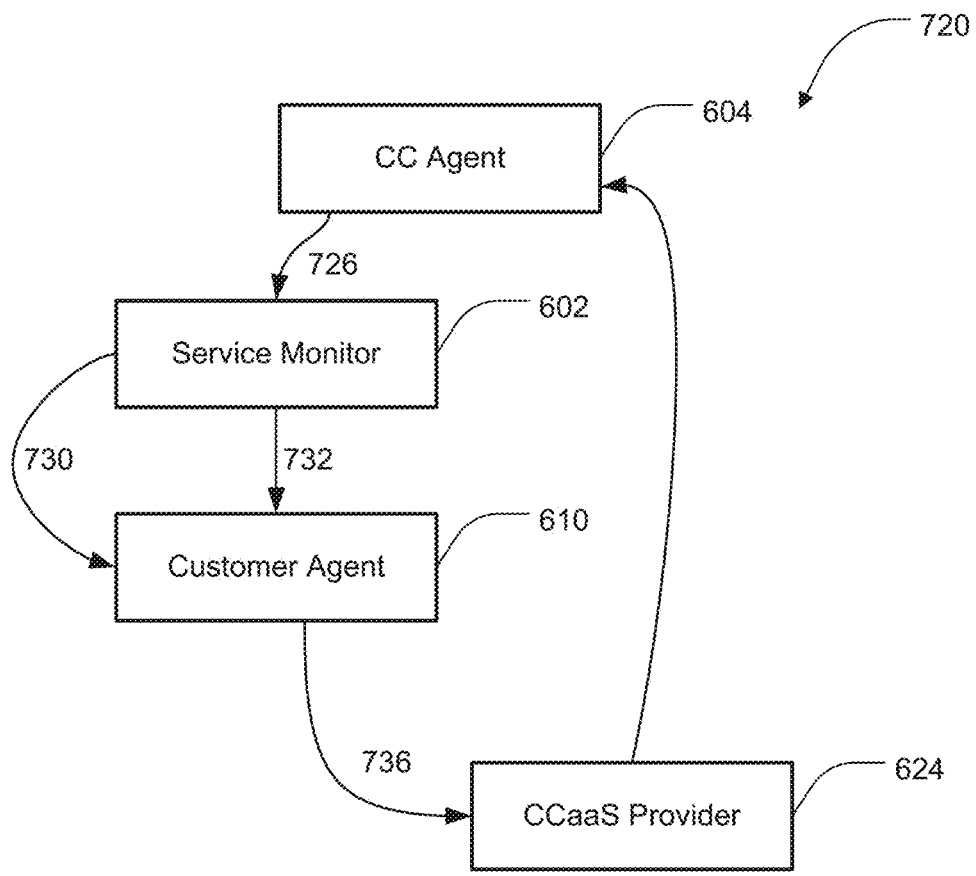

FIG. 7B shows a link test 720 that may be initiated by the service monitor 602 requestion the contact centre agent 604 to operate in an echo mode, not shown. The contact centre agent 604 sends an echo mode started 726 message to the service monitor 602. The echo mode started 726 message indicates that the contact centre agent 604 will echo any audio content received. Such a test allows a reference audio file to play from the customer agent 610, progress to the contact centre agent 604 and then be echoed back to the customer agent 610. The test allows end to end testing in each direction as well as determining latency through the system. A theoretical zero latency system would see the customer agent 610 receiving the reference audio as soon as it was transmitted. Any time delay between transmission of the reference audio file and the reception of the reference audio file are introduced as the reference audio conducts the round trip.

The service monitor 602 sends two commands to the customer agent 610. The first command is a stop recording command 730 to make sure that any recordings currently in progress are stopped. The second command is a start recording command 732 to the customer agent 610 to start recording the audio transmitted and received. Once the recording starts, the customer agent 610 may play the reference audio, shown as play reference file 736. The reference audio is transmitted over the public switched telephone network to the contact centre as a service provider 624 before being transmitted to the contact centre agent 604. Not shown in FIG. 7A is the echo sent from the contact centre agent 604 to the customer agent 610.

Figure 8A:
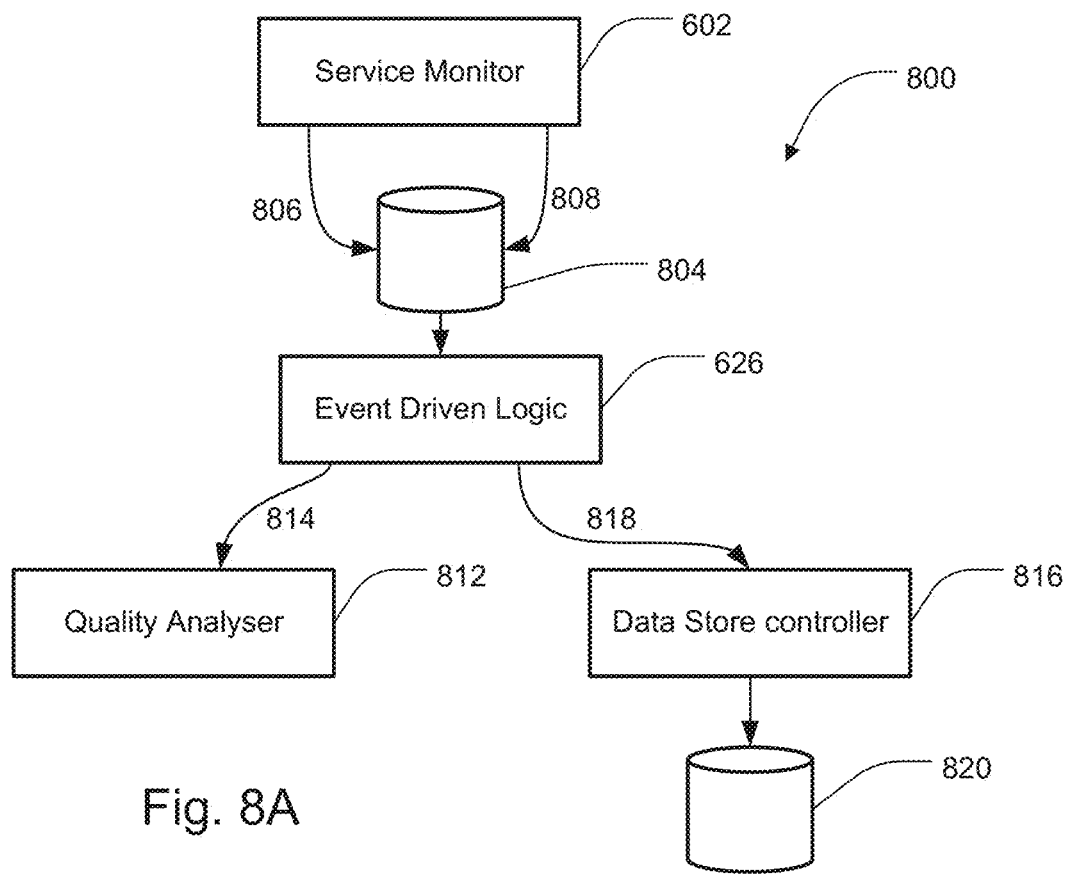
FIGS. 8A and 8B illustrate interactions of the contact centre service monitoring system of FIG. 5 in more detail.

FIG. 8A shows audio quality analysis 800. As described above in relation to FIG. 5, quality analysis is performed using an algorithm such as Perceptual Objective Listening Quality Analysis and the results are stored for later reference. The audio quality analysis 800 is controlled by the service monitor 602 which may upload two types of recordings to a data store 804. The first type of recordings is a contact centre recording 806, which is incoming and outgoing audio recorded at a contact centre service provider, while the second type of recording is a customer agent recording 808 that is outgoing and incoming audio at a customer agent. Both types of recordings are stored in a database such as Amazon S3, or alternatives, operating as data store 804. Once the recordings are stored, event driven logic 626 may use the recordings at a quality analyser 812, passing the recordings and triggering the analysis with a run analysis command 814. Once testing is complete, the results are stored to a results database 820 which is controlled by a data store controller 816. The data store controller 816 may receive transfer data 818 from the event driven logic 626. In some applications, the functions of the event driven logic 626 of FIG. 8A may be replaced by the service monitor 602.

Figure 8B:
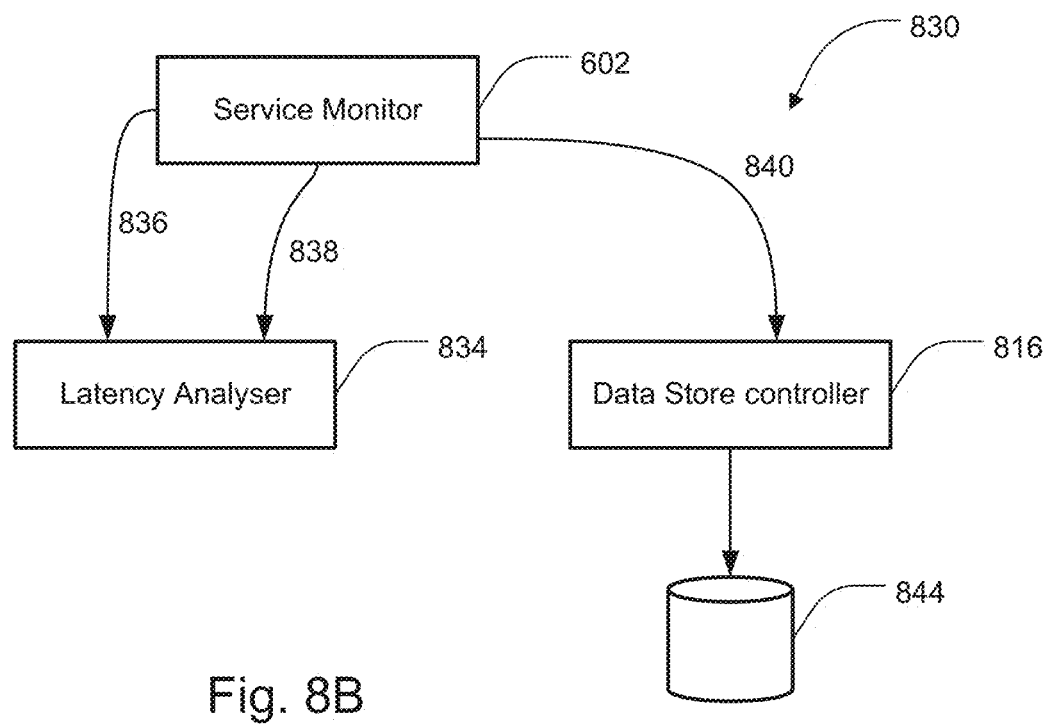

FIG. 8B shows a process for audio latency analysis 830. The process has the service monitor 602 send data to a latency analyser 834. The service monitor 602 sends a customer agent recoding 836 and a test CCaaS provider recording 838. These are reference, or test, audio recordings made at the customer agent and the contact centre service provider respectively. Not shown is retrieval of the recordings from a data store, such as data store 804 shown in FIG. 8A. The audio recordings are sent to the latency analyser 834 for processing to determine latency. The audio recording may include audio sent from the point of presence to the contact centre as well as audio received by the customer agent from the contact centre. Another audio recording may include an audio recording made at the contact centre service provider for audio from both the customer agent and the contact centre agent. The determination of latency for the call will be described in more detail below.

The service monitor 602 may receive the results from the latency analyser 834 and send results data 840 to the data store controller 816. The data store controller 816 may then store the data in a result database 844. Although shown as a separate database, the result database 844 and results database 820 may be the same database. While the service monitor 602 is shown as controlling the data between the latency analyser 834 and the data store controller 816, an alternative architecture could have the latency analyser 834 pass result directly to the data store controller 816 or stored in the result database 844 directly. However, the arrangement shown in FIG. 8B allows for the operations of the latency analyser 834 and the data store controller 816 to be distributed and ensure any processing bottlenecks in the latency analyser 834 do not affect the deposit and retrieval of stored results.

Figure 9A:
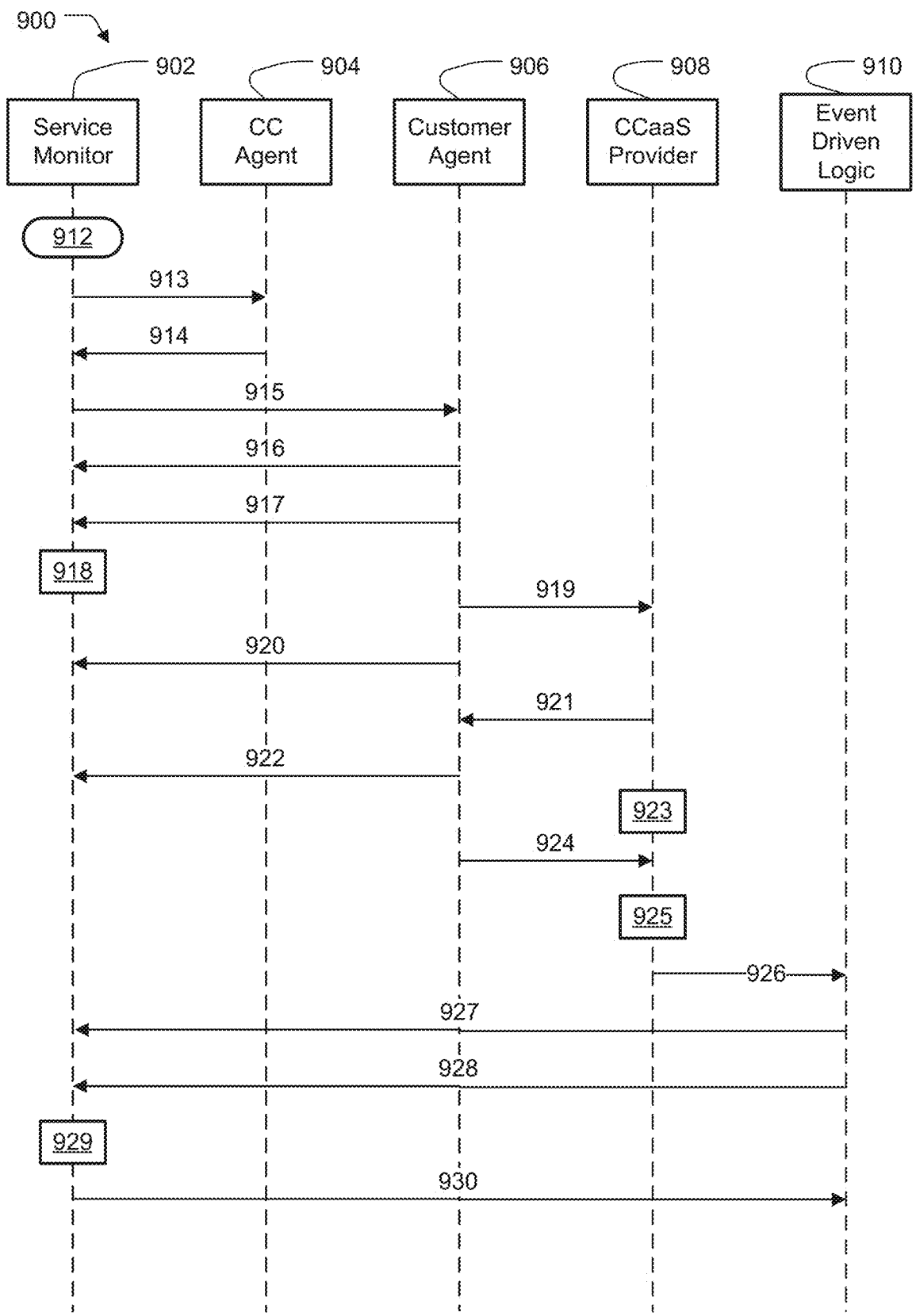
FIGS. 9A, 9B, and 9C is a sequence diagram illustrating operation of the contact centre service monitoring system of FIG. 5.

A detailed example of the global service monitor operation will now be described with reference to global system monitor operation 900 of FIGS. 9A, B and C. The figures show commands and data passed between five components. The components are a service monitor 902, a contact centre agent 904, a customer agent 906, a CCaaS provider 908 and event driven logic 910. As described above, the customer agent and the contact centre agent may be agents with activity triggered by the service monitor 602. The service monitor 902 may operate as one or more computing instances communicating over a network. Generally, the contact centre agent 904, the customer agent 906 and the CCaaS provider 908 are operated at geographic locations selected as part of the operation of the service monitor 902. The contact centre agent 904, customer agent 906 and CCaaS provider 908 may all have a network connection to the service monitor 902, such as network 302 described above in relation to FIG. 3. Many of the actions of the service monitor 902 are conducted by an orchestration layers, such as the orchestration layer 528 of FIG. 5.

The event driven logic 910 may operate as a service provided by the CCaaS provider 908. The event driven logic 910 receives a trigger, such as notification of an event, and may trigger a sequence of actions. One example of such as service is Amazon Web Service's Lambda, which is an event driven, serverless computing platform. The event driven logic 910 may be considered to operate as an agent of the contact centre service provider. The purpose of the event driven logic 910 is to execute additional functions that may be outside the scope of what a CCaaS provider 908 is typically capable of. The event driven logic 910 functions may also by carried out by a more complex system, such as a cloud computing instance running by a provider such as Amazon, Google or Microsoft.

The global system monitor operation 900 commences with a start job 912 where a job ID is created, as well as a customer agent ID, at the service monitor 902. The job ID is used by the service monitor 902 to track all aspects of the testing and results from the testing. Metadata associated with the test may be stored under the job ID and include test configuration information such as geographic locations for the contact centre agent 904, customer agent 906 and CCaaS provider 908, date of the test, how the test was triggered as well as linking to any client information for the test. Next, a make softphone ready 913 command is sent from the service monitor 902 to the contact centre agent 904 to initialise a softphone to allow operation of the contact centre agent 904. The softphone allows the contact centre agent 904 to carry out commands from the service monitor 902 using an API. An example softphone is WebRTC. The contact centre agent 904 notifies the service monitor 902 that the softphone is ready using a softphone ready callback 914.

A call is now initiated by the customer agent 906, being instructed by an initiate call 915 from the service monitor 902. The customer agent 906 responds with a call-initiated callback 916 to the information service monitor 902 that the call has been started. In addition to the call-initiated callback 916, the customer agent 906 may also send a call ID 917 where an identifier for the initiated call is returned to the service monitor 902. The call ID may be generated by the softphone of the contact centre agent 904. The service monitor 902 stores the call ID information in a database at an update job with call ID step 918. The call ID may be associated with the job ID and stored as part of the information regarding the test.

Once the call to the contact centre has been initiated, the customer agent 906 will dial 919 the contact centre and the call is directed to the CCaaS provider 908. The customer agent 906 updates the service monitor 902 with a ringing status callback 920. If the call from the customer agent 906 to the CCaaS provider 908 connects, then the call is answered 921 and the customer agent 906 updates the status of the call to the service monitor 902 with a connected callback 922. The status information sent to the service monitor 902 allows the orchestration layer, such as the orchestration layer 528 to know a current status of the call.

Once the call is answered, the CCaaS provider 908 creates contact ID 923. The contact ID is a unique identifier used by the contact centre service provider to track the connected call and act as an identifier under which information about the call may be stored. Each call received by the contact centre service provider generates a unique contact ID. Next, the customer agent 906 will play a DTMF 924 where the job ID, determined earlier by the service monitor 902, is sent to the CCaaS provider 908 using dual tone multi-frequency signalling. For play DTMF 924 to be interpreted correctly, the CCaaS provider 908 needs to be programed to expect the job ID to be sent via dual tone multi-frequency signalling. An alternative is for the customer agent 906 to play a predetermined selection of dual tone multi-frequency (DTMF) signals to select a diagnostic mode for the call. The job ID, or some other identifier may then be transmitted over the phone line to uniquely identify the call. Another alternative is for caller ID to be used at the contact centre service provider. The CCaaS provider 908 will then know if a test is to be performed based on the phone number associated with the call. The purpose of sending the job ID over the public switched telephone network, or using the caller phone number, is to identify the call and allow a network connection between the service monitor 902 and the CCaaS provider 908 to collect information about the call. By sending the job ID to the CCaaS provider 908, the call can be selected from all of the calls being received by the CCaaS provider 908, using the job ID. When the job ID is received, the CCaaS provider 908 executes an update call attributes with job ID 925.

The job ID and contact ID are passed on to the event driven logic 910, as shown by a pass job attribute and contact ID 926, from the CCaaS provider 908. The contact ID and the job ID are typically sent over a network link between the CCaaS provider 908 and the event driven logic 910.

Currently, the call is connected from the customer agent 906 to the CCaaS provider 908 and information sent to the event driven logic 910. Next, the event driven logic 910 sends the service monitor 902 information and a request for information with a job details request 927 and a send contact ID 928. The service monitor 902 stores the information from the event driven logic 910 at update job with contact ID 929 where the contact ID is stored in a database, after being associated with the job ID. Agent name and call ID 930 is then passed from the service monitor 902 to the event driven logic 910, delivering the customer agent ID and the call ID received from the customer agent 906. The agent's name and call ID 930 is sent by the service monitor 902 in response to the job details request 927.

Figure 9B:
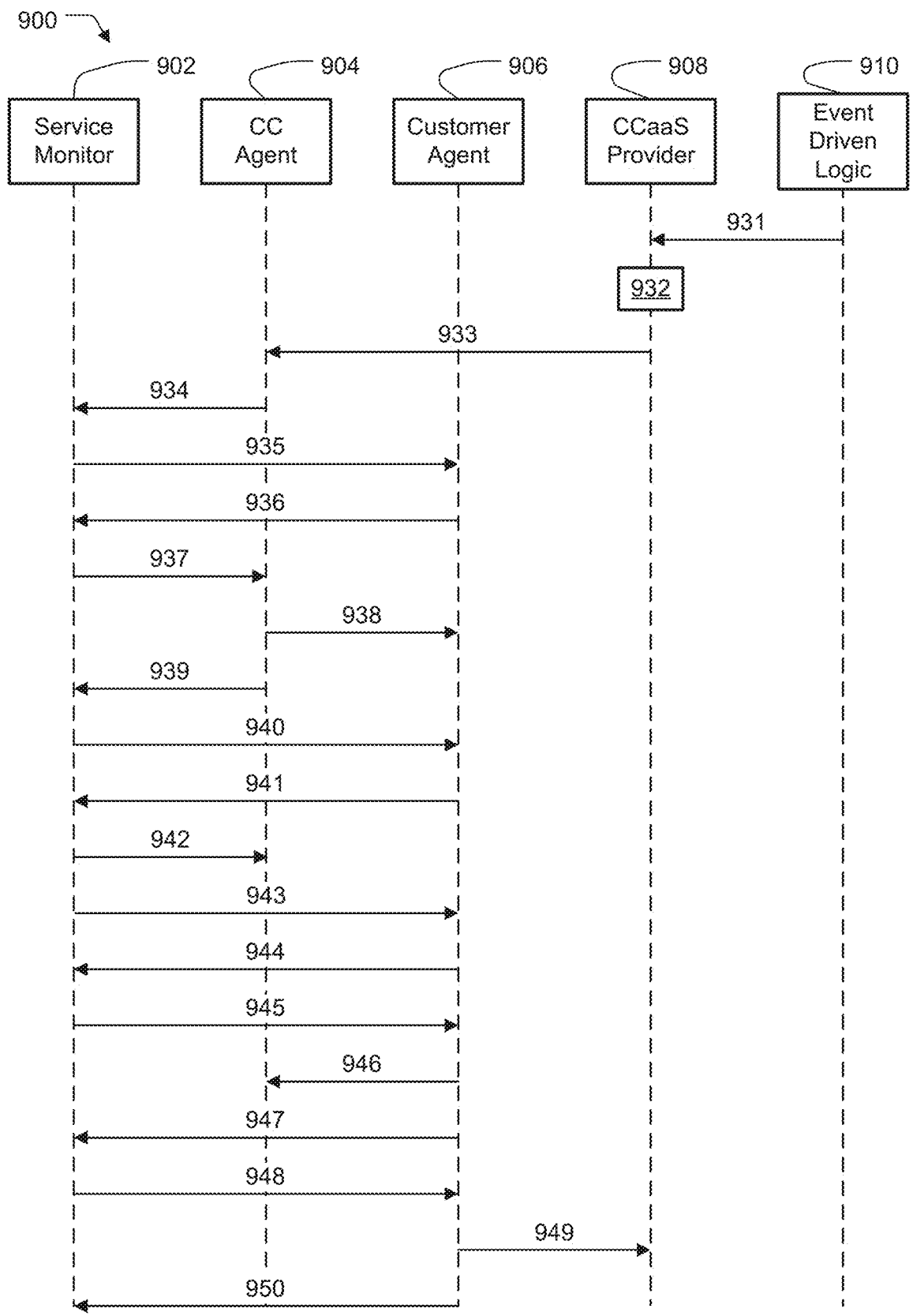

The global system monitor operation 900 continues on FIG. 9B with a payload 931 sent from the event driven logic 910 to the CCaaS provider 908. The payload 931 sends the customer agent ID and call ID received by the event driven logic 910 from the service monitor 902. The payload 931 may include the customer agent ID and/or the call ID. The CCaaS provider 908 updates information regarding the call at an update contact attributes with payload step 932. Next, the call circuit is completed by connecting the call from the CCaaS provider 908 to the contact centre agent 904 at route call 933 and the service monitor 902 is updated of the status of the call at a connect status callback 934.

Now that the call circuit is complete from the caller to the receiver, testing of the call connection may start. The testing performed as part of the global system monitor operation 900 has audio being played on to the call by the contact centre agent 904 and the customer agent 906. There are two tests conducted, a first audio test and a second audio test. The first audio test is from the contact centre agent 904 to the customer agent 906 and is performed to determine audio quality of the call. The second audio test is from the customer agent 906 to the contact centre agent 904 which will echo any incoming audio back to the customer agent 906. The second audio test is conducted to determine audio quality as well as latency.

The first audio test starts with the service monitor 902 sending an enable recording session 1 935 to the customer agent 906 and the command being acknowledged with a recording callback 936 that includes a recording ID. With recording started, a play reference audio sample 937 command is sent from the service monitor 902 to the contact centre agent 904 where the command triggers the contact centre agent 904 to play reference audio sample 938 to the customer agent 906. Although not shown in FIG. 9B, the reference audio sample is played down the phone line and will be transmitted through the CCaaS provider 908 to the customer agent 906. Once the audio file has finished a reference audio completed callback 939 is sent from the contact centre agent 904 to the service monitor 902 to notify the service monitor 902 that playing the audio file for the first audio test is complete. To finalise the first audio test an end recording session 1 940 command is sent to the customer agent 906 from the service monitor 902. The customer agent 906 acknowledges receipt of the end recording session 1 940 and signals the service monitor 902 that the recording has been stopped with a recording ended callback 941.

A second audio test is now performed by the global system monitor operation 900. As discussed above, the second audio test is conducted with the contact centre agent 904 in echo mode, where any incoming audio is sent back out as outgoing audio. The contact centre agent 904 is placed into echo mode using a switch to echo mode command 942 from the service monitor 902. Although not shown, the contact centre agent 904 may send an acknowledgement signal to the service monitor 902 to indicate that echo mode is now active. The service monitor 902 initiates a new, second, audio test by sending an enable recording session 2 command 943. For the first audio test, the contact centre agent 904 played the audio recording. For the second audio test, the customer agent 906 plays the audio command. The customer agent 906 responds with a recording callback 944 to indicate that the enable recording session 2 command 943 was received and a recording session has been started.

A play reference audio sample command 945 is sent from the service monitor 902 to the customer agent 906. The audio sample is played by the customer agent 906 to the contact centre agent 904 at play out reference audio sample 946. Not shown in FIG. 9B is the path of the audio playback from the customer agent 906, to the CCaaS provider 908 and to the contact centre agent 904. The customer agent 906 notifies the service monitor 902 that playing the reference audio is complete with a reference audio completed callback 947. The reference audio completed callback 947 also signals to the service monitor 902 that the second audio test is complete.

As the second audio test is conducted with the contact centre agent 904 in echo mode, the test will take longer than playing the reference audio file. The duration of the second test should not be excessively longer than the duration of the reference audio file. The service monitor 902 may give the customer agent 906 additional time to finish the second audio test, or the customer agent 906 may monitor incoming audio to determine that all of the reference audio file has been received. This may be done, for example, by detecting an end tone played to signify the end of the reference audio playback.

With completion of second audio test the service monitor 902 starts to terminate the call. First the service monitor 902 sends an end call command 948 to the customer agent 906 which issues a hangup command 949. When the call is ended, the end of call is indicated over the call as typically done for a telephone call. The end of the call is handled by the CCaaS provider 908 and the contact centre agent 904, the same way that the end of any other call occurs. The CCaaS provider 908 and the service monitor 902 will close the call, complete all logs, finalise recordings and any other actions for the completed call. The customer agent 906 notifies the service monitor 902 that the recording for the second audio test has ended with a recording completed callback 950.

Figure 9C:
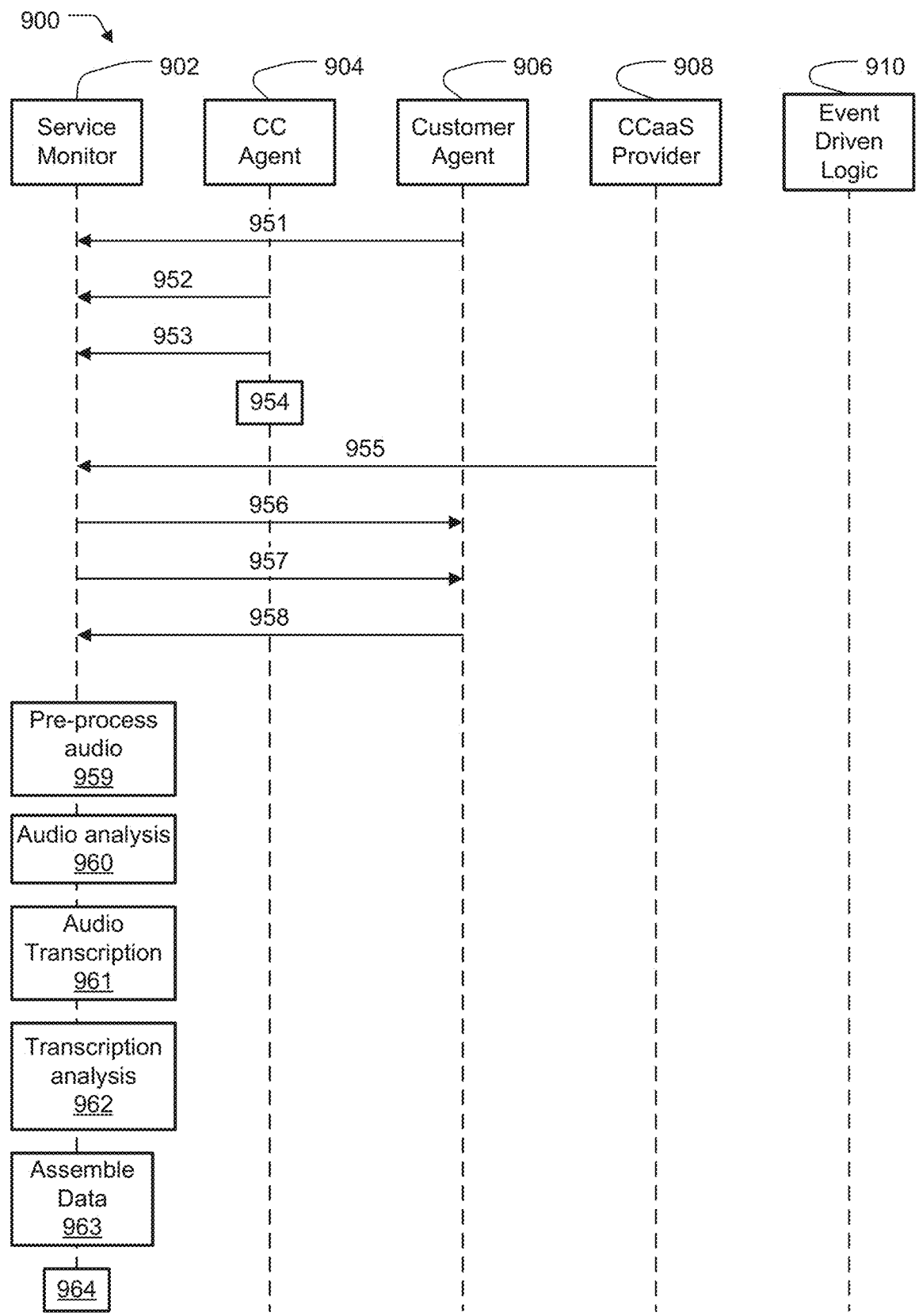

The global system monitor operation 900 continues on FIG. 9C where the customer agent 906 acknowledges the end of call with a call completed callback 951. Next, the contact centre agent 904 sends softphone and network statistics 952 to the service monitor 902 as well as contact centre agent audio recording 953. The contact centre agent audio recording 953 is typically audio for the first and second audio tests. The contact centre agent 904 will then finish the test session and may terminate or go into a sleep mode with a clear down session 954.

As stated above, the CCaaS provider 908 knows that the call has terminated as the phone call has been disconnected by the customer agent 906. As part of the end of call operations of the CCaaS provider 908, logs and recordings 955 are sent to the service monitor 902 over the network connection. The logs will include information such as timing of events during the call, such a call start, call duration, information about which server executed the call operations and line diagnostic information such as allocated bandwidth to the contact centre agent 904. The recordings are audio recordings for the first and second audio tests recorded at the CCaaS provider 908. The recordings include both incoming and outgoing between the CCaaS provider 908 and the contact centre agent 904 as well as incoming and outgoing between the CCaaS provider 908 and customer agent 906. The service monitor 902 also sends a get recordings command 956 and a get telco and network statistics command 957 to the customer agent 906. The customer agent 906 sends the recordings and statistics 958 to the service monitor 902.

The call has terminated and the recordings, statistics and log information has been collected by the service monitor 902 from the contact centre agent 904, customer agent 906 and the CCaaS provider 908. The service monitor 902 now commences an analysis phase where the recordings, statistics and log information is processed to determine quality information for different links in the call. While the analysis is shown as operating sequentially, some of the analysis may be executed in a different order. Alternatively, some of the analysis and transcriptions may be executed in parallel, depending on available computational resources.

Before any analysis of the audio occurs, audio pre-processing 959 takes the audio files and performs a number of clean-up operations. For example, trimming start and end silence and synchronising time stamps across the audio files. As described above, the reference audio files may have a tone to indicate a start and end of the audio. The audio pre-processing 959 may locate the start and end indicators and trim the recordings to remove the indicators. The audio files may be also be re-sampled so that all the audio files use the same audio sampling rate. Generally, the audio pre-processing 959 is carried out to improve the quality audio recording to produce better test results when analysis such as Perceptual Objective Listening Quality Analysis is performed on the audio files.

Next, the audio records have perceptual analysis performed at a recording analysis 960. Such analysis may use Perceptual Objective Listening Quality Analysis or an alternative test. Alternatively, multiple tests may be conducted, and the different results used. The recording from the contact centre agent 904, customer agent 906 and CCaaS provider 908 are analysed for the first and second audio tests. The results of the testing are audio quality for each of the following:
1. Contact centre agent 904 incoming audio;
2. Customer agent 906 incoming audio;
3. CCaaS provider 908 incoming audio from the contact centre agent 904; and
4. CCaaS provider 908 incoming audio from the customer agent 906.

The four results provide quality information for each communication direction for the call audio between the contact centre agent 904 and the CCaaS provider 908, as well as between the customer agent 906 and the CCaaS provider 908.

As part of the recording analysis 960 a test of call latency may be determined. The latency test may be performed by a latency analyser, such as the latency analyser 536. The call latency uses information from the second audio test where the contact centre agent 904 is operating in an echo mode. The latency tests work by looking at incoming and outgoing times of the audio. The audio file that is played may have one or more alignment marks in the file. An example of an alignment mark is a start or end tone. Another example of an alignment mark is a transition from silence to speech. Latency may be determined for two legs of the call. The first leg between the customer agent 906 and the CCaaS provider 908 and the second leg between the CCaaS provider 908 and the contact centre agent 904.

At the customer agent 906, a total call latency may be determined between when the reference audio sample is sent and when the reference audio sample is received. This determines a latency for the whole call. Next, a contact centre latency may be determined between when the reference audio is sent from the CCaaS provider 908, to the contact centre agent 904, and when the CCaaS provider 908 receives the reference audio. A PSTN latency, between the CCaaS provider 908 and the customer agent 906, may be determined by subtracting the contact centre latency from the total call latency. The result is three latency measures, a first for the whole call, a contact centre latency between the CCaaS provider 908 and the contact centre agent 904, and the PSTN latency between the CCaaS provider 908 and the customer agent 906. The determined latency values may be compared to a predetermined latency value and latency quality determined for the overall call, the contact centre link and the PSTN link.

Another test that may be performed is a test of audio transcription services. This may be performed if one of the audio samples played during the testing was a voice recording. Typically, the audio recording may be a recording of a script. The script may be used to validate audio transcription services for accuracy. One or more audio transcriptions may be performed at audio transcription 961. The audio transcription 961 may use different algorithms or different services to perform the transcription. The performance is then analysed at a transcription performance analysis 962 where the accuracy of the transcriptions may be compared with each other or, for greater accuracy, against the script of the audio. The transcription performance may also be linked to the quality analysis to link audio quality to the accuracy of the transcription.

The recordings, results, logs and call metadata is collated and stored to allow access by other software service, or even for access by the service monitor 902, at an assemble datasets for API 963. As shown in FIG. 5 the data stores 530 is accessed by the API interface 540 to provide access to the results. The API may be used by a client to get result, schedule tests or to change test parameters. The API may also be used to generate a user interface to display test results using a web server or similar graphical display. The contact centre agent 524, audio file manager 532, answer seizure ratio analyser 534, latency analyser 536 and API interface 540 may be executed as a microservice, such as Amazon Web Services Lambda, and the quality analyser 538 may be executed as a virtual server. Alternative means for execution may be used.

While the global system monitor operation 900 is shown with a specific sequence of operation, the order of some operations may be modified without effecting operation of the global service monitor. Some of the data passed between components may be sent in parallel, earlier or later than shown in the global system monitor operation 900. The global system monitor operation 900 may also perform additional test that are not shown. One example of such a test is answer seizure ratio resting, as described above in relation to answer seizure ratio analyser 534 of FIG. 5.

While the customer agent is described above as an entity separate to the global service monitor 501, the features of the customer agent may be incorporated into the global service monitor. The global service monitor would incorporate the features of a soft phone and interact with the public switched telephone network, through a point of presence, directly. The point of presence would have a geographic location selected during operation of the global service monitor. The global service monitor would then play and record reference audio files to the customer agent, through the point of presence. In such a situation, the point of presence would provide a geographic location while the global service monitor provides all other functions of the customer agent. Such an arrangement may be advantageous as it allows greater control over the operations of the customer agent.

While the call described above is initiated by the customer agent, the contact centre agent may also be used to initiate the call. Typically, the quality of the call is unrelated to where the call is initiated so starting the call from the customer agent or the contact centre agent should not have an effect on the test results.

The global service monitor 501 allows for call quality test of a contact centres using a contact centre service provider. As the functions of the contact centre are distributed between systems operated by different companies, the global service monitor allows determination of where reductions of audio quality occur. The audio quality may be determined for different links that make up the call. The global service monitor also allows for latency to be determined for each of the links as well.

The figures included herewith show aspects of non-limiting representative embodiments in accordance with the present disclosure, and particular structural elements shown in the figures may not be shown to scale or precisely to scale relative to each other. The depiction of a given element or consideration or use of a particular element number in a particular figure or a reference thereto in corresponding descriptive material can encompass the same, an equivalent, an analogous, categorically analogous, or similar element or element number identified in another figure or descriptive material associated therewith. The presence of "/" in a figure or text herein is understood to mean "and/or" unless otherwise indicated, i.e., "A/B" is understood to mean "A" or "B" or "A and B".

Many modifications will be apparent to those skilled in the art without departing from the scope of the present invention.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

What is claimed is:

1. A method of determining call quality for a contact centre, the method comprising:
   initialising a call between a customer agent and a contact centre agent, the customer agent connecting to the call at a point of presence having a selectable geographic location;
   receiving monitoring information, for the call, measured at the customer agent, the contact centre agent and a contact centre service provider connecting the call between the customer agent and the contact centre agent; and
   determining quality of the call from the monitoring information collected from the customer agent, the contact centre agent and the contact centre service provider.

2. The method of determining the call quality for the contact centre according to claim 1, wherein a quality is determined between the customer agent and the contact centre service provider.

3. The method of determining the call quality for the contact centre according to claim 2, wherein the quality between the customer agent and the contact centre service provider comprises a quality measure from the customer agent to the contact centre service provider and from the contact centre service provider to the customer agent.

4. The method of determining the call quality for the contact centre according to claim 1, wherein a quality is determined between the contact centre service provider and the contact centre agent.

5. The method of determining the call quality for the contact centre according to claim 4, wherein the quality between the contact centre service provider and the contact centre agent comprises a quality measure from the contact centre service provider to the contact centre agent, and the contact centre agent to the contact centre service provider.

6. The method of determining the call quality for the contact centre according to claim 1, further comprising:
   connecting to the contact centre service provider to collect the monitoring information, the monitoring information comprising audio recordings made at the contact centre service provider.

7. The method of determining the call quality for the contact centre according to claim 1, wherein the contact centre agent is software executed on a contact centre agent server.

8. The method of determining the call quality for the contact centre according to claim 7, further comprising:
   connecting to the contact centre agent to collect the monitoring information, the monitoring information comprising audio recordings made by the contact centre agent software.

9. The method of determining the call quality for the contact centre according to claim 1, further comprising:
   connecting to the customer agent to collect the monitoring information, the monitoring information comprising audio recording made at the customer agent.

10. The method of determining the call quality for the contact centre according to claim 1, wherein determining the call quality is determined at a remote location to the customer agent, the contact centre service provider and the contact centre agent.

11. The method of determining the call quality for the contact centre according to claim 1, wherein the customer agent, the contact centre service provider and the contact centre agent are at different locations.

12. A system for determining call quality of a contact centre, the system comprising:
   a contact centre monitor comprising:
   a caller to initialise a call between a customer agent and a contact centre agent, the customer agent connecting to the call at a point of presence having a selectable geographic location;
   a service monitor to receive monitoring information, for the call, measured at the customer agent, the contact centre agent and a contact centre service provider connecting the call between the customer agent and the contact centre agent; and
   a quality analyser to determine quality of the call from the monitoring information collected from the customer agent, the contact centre agent and the contact centre service provider.

13. The system for determining the call quality for the contact centre according to claim 12, wherein the quality analyser determines a quality between the customer agent and the contact centre service provider.

14. The system for determining the call quality for the contact centre according to claim 13, wherein determining the quality between the customer agent and the contact centre service provider comprises determining a quality measure from the customer agent to the contact centre service provider and from the contact centre service provider to the customer agent.

15. The system for determining the call quality for the contact centre according to claim 12, wherein the quality analyser determines a quality between the contact centre service provider and the contact centre agent.

16. The system for determining the call quality for the contact centre according to claim 15, wherein determining the quality between the contact centre service provider and the contact centre agent comprises determining a quality measure from the contact centre service provider to the contact centre agent, and the contact centre agent to the contact centre service provider.

17. The system for determining the call quality for the contact centre according to claim 12, wherein the service monitor connects to the contact centre service provider to collect the monitoring information, the monitoring information comprising audio recordings made at the contact centre service provider.

18. The system for determining the call quality for the contact centre according to claim 12, wherein the contact centre agent is software executed on a contact centre agent server.

19. The system for determining the call quality for the contact centre according to claim 18, wherein the service monitor connects to the contact centre agent to collect the monitoring information, the monitoring information comprising audio recordings made by the contact centre agent software.

20. The system for determining the call quality for the contact centre according to claim 12, wherein the service monitor connects to the customer agent to collect the monitoring information, the monitoring information comprising audio recording made at the customer agent.

21. The system for determining the call quality for the contact centre according to claim 12, wherein the quality analyser determines the call quality at a remote location to the customer agent, the contact centre service provider and the contact centre agent.

22. The system for determining the call quality for the contact centre according to claim 12, wherein the customer agent, the contact centre service provider and the contact centre agent are at different locations.

\* \* \* \* \*